United States Patent [19]

Hara et al.

[11] Patent Number: 4,626,875

[45] Date of Patent: Dec. 2, 1986

[54] APPARATUS FOR LIQUID-JET RECORDING WHEREIN A POTENTIAL IS APPLIED TO THE LIQUID

[75] Inventors: Toshitami Hara, Tokyo; Hisanori Tsuda, Atsugi; Shinichi Hirasawa, Hiratsuka, all of Japan

[73] Assignee: Canon Kabushiki Kaisha, Tokyo, Japan

[21] Appl. No.: 652,888

[22] Filed: Sep. 21, 1984

[30] Foreign Application Priority Data

Sep. 26, 1983 [JP] Japan ............................... 58-177281
Sep. 26, 1983 [JP] Japan ............................... 58-177282
Sep. 26, 1983 [JP] Japan ............................... 58-177283

[51] Int. Cl.⁴ ............................................. G01D 15/18

[52] U.S. Cl. ................................ 346/140 R; 204/196; 219/322; 307/95

[58] Field of Search .......................... 346/140; 307/95; 219/322, 481, 507; 204/196

[56] References Cited

U.S. PATENT DOCUMENTS

| | | | |
|---|---|---|---|
| 4,091,391 | 5/1978 | Kozima et al. | 346/76 |
| 4,345,262 | 8/1982 | Shirato et al. | 346/140 |
| 4,370,668 | 1/1983 | Hara et al. | 346/140 |
| 4,401,993 | 8/1983 | Moriguchi et al. | 346/76 PH |
| 4,450,457 | 5/1984 | Miyachi | 346/140 |

*Primary Examiner*—Joseph W. Hartary

*Attorney, Agent, or Firm*—Fitzpatrick, Cella, Harper & Scinto

[57] ABSTRACT

An apparatus for liquid-jet recording having heat-generating means and means for jetting a liquid utilizing an energy generated by the heat-generating means comprises an electrode provided in contact with the liquid in impart a potential to the liquid lower than the potential used to generate heat.

16 Claims, 13 Drawing Figures

APPARATUS FOR LIQUID-JET RECORDING WHEREIN A POTENTIAL IS APPLIED TO THE LIQUID

BACKGROUND OF THE INVENTION

1. Field of the Invention

This invention relates to an apparatus for liquid-jet recording by jetting liquid droplets utilizing energy generated by a heat-generating means.

2. Description of the Prior Art

FIG. 1(*a*) is a cross-sectional plan view showing one example of the conventional liquid-jet recording head, and FIG. 1(*b*) is a cross-sectional view along the line A—A of FIG. 1(*a*), where a heat-generating means composed of an electro-thermal transducing parts 2 (as will be hereinafter referred to as "heat-generating part") and an electroconductive parts 3 is formed on a substrate 1, and a protective film (not shown on the drawings) is formed thereon. Each of the heat-generating parts 2 is partitioned by grooved plates 4 to form a liquid passage 5 having a thermal action chamber in which the heat energy generated by said heat-generating means acts on a liquid, and a liquid supply chamber 6. A discharge outlet 7 is provided at one end of the liquid passage 5, and the liquid is jetted from the discharge outlet The liquid to be jetted is supplied through a liquid supply pipe 8 provided at the opposite side of the discharge outlet 7 across the heat-generating means to fill the liquid supply chamber 6 and the liquid passage 5.

The liquid can be jetted from the discharge outlet 7 by the heat generated at the heat-generating parts 2. The heat is generated by applying a predetermined pulse voltage to the electroconductive parts 3 connected with the heat-generating parts 2. When the voltage is applied thereto, the liquid near the heat-generating parts 2 undergoes rapid state changes accompanied by bubble formation by the generated heat energy, and the bubbles rapidly grow within the liquid passage 5. The liquid on the side of discharge outlet 7 is pushed out of the discharge outlet 7 rapidly by the generated pressure to form sputtered liquid droplets. The sputtered liquid droplets are deposited onto a recording material to perform recording. When the applied voltage is turned off, the bubbles contract rapidly and vanish.

In such a liquid-jet head, a protective film is generally provided so that the electro-thermal transducing means having the heat-generating parts 2 and the electroconductive parts 3, i.e., a heat-generating means having a resistor and at least one pair of electrodes electrically connected with the resistor as counterposed to the heat-generating part of the resistor may be protected from any contact with the liquid.

FIG. 2 is a cross-sectional view of detail of the heat-generating part 2 of the liquid-jet recording head shown in FIG. 1(*b*), where a resistor 9 and an electrode 10 are formed on the substrate 1, and the part only of resistor 9 corresponds to the heat-generating part 2 in FIG. 1 and the part of the resistor 9 which is overlapped electrode 10 corresponds to the electroconductive part 3 in FIG. 1. The resistor 9 and electrode 10 as the heat-generating means is protected from a liquid 12 by a protective film 11.

The resistor 9 and electrode 10 have a risk of deterioration, changes in resistance or breaking-down due to chemical reactions such as oxidation reaction, electrolysis, etc., when brought into contact with the liquid 12. Thus, the protective film 11 is provided to prevent such a risk. Protective film 11 functions properly when it is free of defects, and the resistor 9 and electrode 10 are completely separated from the liquid 12, and a long life of the resistor 9 can be ensured.

However, it is actually very difficult to form such an ideal protective film. In the ordinary manufacturing process, fine defects 13 of less than a few microns are inevitably formed on the protective film 11, as shown in FIG. 2. Furthermore, defects 13 are also formed on the protective film 11 due to the thermal stress caused by the heat generation at the heat-generating part 2 of the resistor 9 or impacts, etc. caused by generation and vanishing of bubbles as described above. The presence of defects 13 allows the liquid 12 to contact with the resistor 9 and the electrode 10 to cause electrochemical reaction. The rate of the electrochemical reaction greatly depends on the species of resistor 9 and electrode 10, heat generation temperature of resistor 9, the species of ions in the liquid, etc. Once defects 13 are formed on the heat-generating part 2, the heat-generating part 2 of resistor 9 is damaged and broken down only with about $10^5$-$10^6$ applications of voltage, and has no practical durability. Practical durability is such that the resistor 9 (particularly, heat-generating part 2) or electrode 10 may not be damaged even after at least about $10^8$ applications of pulse voltage.

Thus, the presence of defects 13 on the protective film 11 shortens the life of heat-generating part 2 of resistor 9, and consequently shortens the life of the head, because breakage of only one resistor can terminate the life of the head, even if the head is of full-line multiorifice type. However, it is very difficult to completely remove the defects 13 as already described above. An increase in the thickness of protective film 11 must be avoided for such reasons as a decrease in thermal efficiency, deterioration of heat response to input signals, etc. Thus, in the production of the conventional recording heads, some heads with a short life are unavoidably involved, and the product reliability is considerably reduced.

SUMMARY OF THE INVENTION

The present invention has been established in view of the problems encountered in the prior art.

An object of the present invention is to provide an apparatus for liquid-jet recording with a practically long life even if a protective film for a heat-generating means has the same level defects as that of the prior art.

According to one aspect of the present invention, there is provided an apparatus for liquid-jet recording having heat-generating means and means for jetting a liquid utilizing an energy generated by the heat-generating means, which comprises an electrode provided in contact with the liquid to impart a potential to the liquid.

According to another aspect of the present invention, there is provided an apparatus for liquid-jet recording having heat-generating means comprising a heat-generating resistor and a pair of electrodes electrically connected with the resistor as counterposed to the heat-generating part of resistor, and means for jetting a liquid utilizing an energy generated by the heat-generating means, which comprises a third electrode different from the electrodes provided in contact with the liquid to impart a potential to the liquid.

BRIEF DESCRIPTION OF THE DRAWINGS

FIG. 1(*b*) is a schematic cross-sectional view along the line A—A in FIG. 1(*a*).

DESCRIPTION OF THE PREFERRED EMBODIMENTS

Figure 1A:
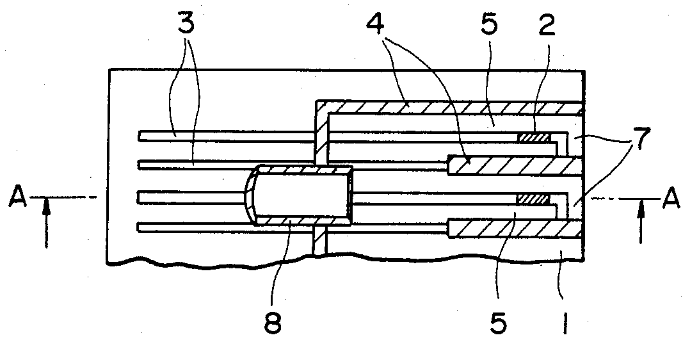
FIG. 1(a) PRIOR ART
FIG. 1(*a*) is a schematic, partially cut-away plan view showing an example of conventional liquid-jet recording head.
Figure 1B:
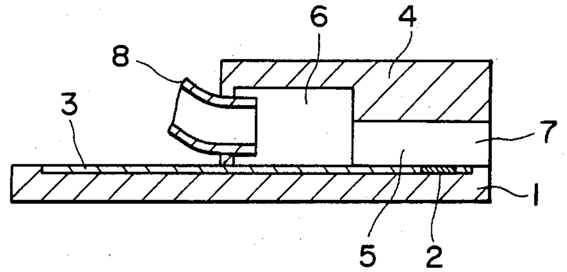
FIG. 1(b) PRIOR ART
Figure 2:
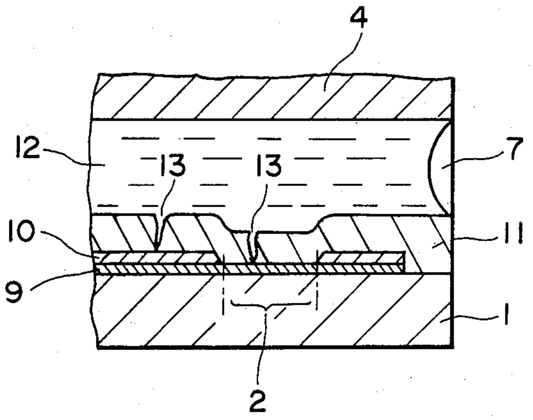
FIG. 2 PRIOR ART
FIG. 2 is a schematic, partial cross-sectional view showing detail of the heat-generating part in FIG. 1(*b*).
Figure 3:
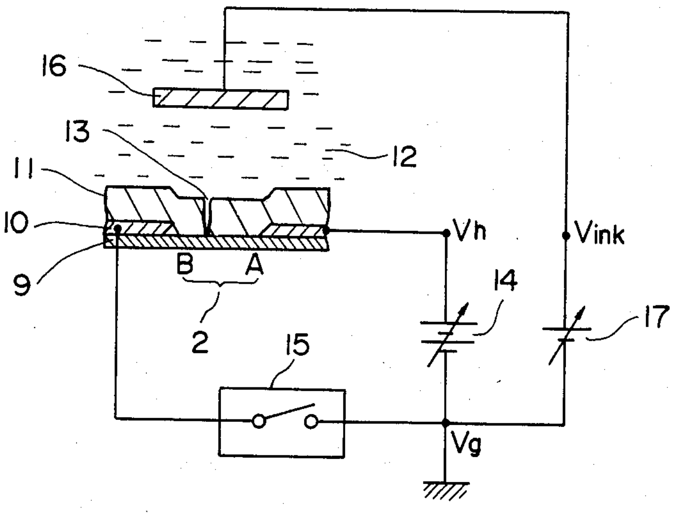
FIG. 3 is a basic structural view showing one embodiment of an apparatus for liquid-jet recording according to the present invention.
Figure 4:
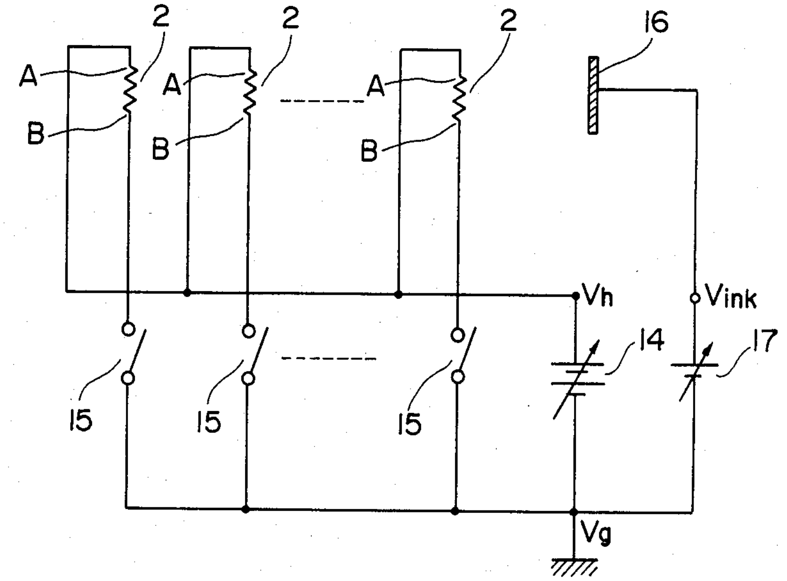
FIG. 4 is a wiring diagram of the embodiment shown in FIG. 3.

FIG. 3 is a schematic, basic structural view showing one embodiment of an apparatus for liquid-jet recording according to the present invention, and FIG. 4 is a wiring diagram for this embodiment, where a voltage Vh is applied to one end of electrode 10 from a power source 14, while the other end of electrode 10 is connected with a switching transistor 15 across the heat-generating part 2 of resistor 9. The switching transistor 15 is brought into an on or off state according to a predetermined signal and works to supply a pulse-form voltage to the heat-generating part 2 of resistor 9. The structure so far described is the same as that of the prior art. In the present invention, an electrode 16 is further provided in contact with a liquid 12 to apply a voltage $V_{ink}$, as will be hereinafter referred to as "$V_{ink}$", to the liquid 12 from a power source 17.

In the conventional liquid-jet recording head without the electrode 16 shown in FIG. 3, the potential of liquid 12 will be substantially on the same level as Vh supplied from the power source 14, if the protective film 11 has a defect 13. Thus, the location A of the heat-generating part 2 at which the voltage Vh is applied has no substantial difference in potential from the liquid 12, and consequently no electrochemical reaction proceeds so rapidly between the liquid 12 and the resistor 9 or the electrode 10. However, the potential at the location B will fall nearly to the ground voltage Vg when the switching transistor 15 is brought into an on state, and thus a potential difference such as Vh−Vg develops between the liquid 12 and the location B. If the defect 13 exists near the location B, the electric current is thus liable to pass through defect 13, and consequently an electrochemical reaction occurs between the resistor 9 and the liquid 12 and ultimately the resistor 9 is damaged and broken down.

The progress of electrochemical reaction due to the defects is not completely understood but it is certain that, when the liquid 12 has a high potential and the resistor 9, or the electrode 10 has a low potential, an electric current is liable to pass from the liquid 12 to the resistor 9 or the electrode 10, and when the resistor 9 or the electrode 10 has a higher potential than that of the liquid 12 on the contrary, the electric current is less likely to flow between liquid 12 to the resistor 9 or the electrode 10.

That is, when the liquid 12 has a higher potential, the electrochemical reaction between the liquid 12 and the resistor 9 or the electrode 10 proceeds rapidly, and when the resistor 9 or the electrode 10 has a higher potential than that of the liquid 12 or has no remarkable difference in potential from that of the liquid 12, the electrochemical reaction hardly proceeds because the electric current is less likely to flow. Thus, the life of resistor 9 (particularly, the heat-generating part 2) or electrode 10 can be prolonged. The present invention utilizes this phenomenon.

In FIGS. 3 and 4, the electrode 16 is provided to impart a potential to the liquid 12. The potential Vink on the electrode 16 is adjusted by controlling the power source 17, and the potential of liquid 12 is adjusted thereby, so that the electrochemical reaction between the liquid 12 and the resistor 9 or the electrode 10 can be controlled.

Specific examples of positions of electrode 16 are described, referring to FIGS. 5 through 9.

Electrode 16 can be provided at any position, so long as the potential of the liquid can be controlled at that position, but in view of easy control of the potential of the liquid, it is desirable to provide the electrode 16 at a position within about 1 mm from the heat-generating part 2 of the resistor. If the electrode 16 is provided too far from the heat-generating part 2, it will be difficult to set the liquid to a desired potential due to the electrical resistance of the liquid, etc., whereas, when the electrode 16 is provided at a position so near the heat-generating means as to contact with the protective film 11 on the heat-generating means, insulating breakage, etc. of the protective film may occur. Thus, it is most desirable that the electrode 16 is provided at a position within 1 mm from the heat-generating means so that there can be at least the liquid between the heat-generating means and the electrode 16.

Figure 5:
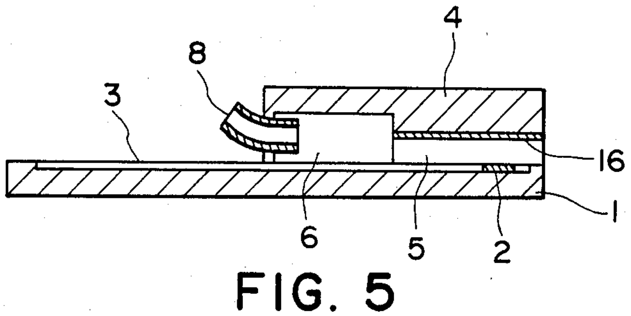
FIG. 5 through FIG. 10 are schematic cross-sectional views of an apparatus for liquid-jet recording, showing positions of the electrode for imparting a potential to a liquid.

When the electrode 16 is provided on the upper wall of liquid passage 5 shown in FIG. 5 in view of said desirability, the electrode can be formed near the heat-generating part with such advantages that inconveniences such as complications in manufacturing steps can be avoided by forming the electrode on the upper wall by plating, etc., and by simplified assembling the electrode into the head. It is likewise desirable to provide the electrode 16 on the side wall of liquid passage 5.

Other preferable positions for providing the electrode 16 are shown in FIGS. 6 through 9.

Figure 6:
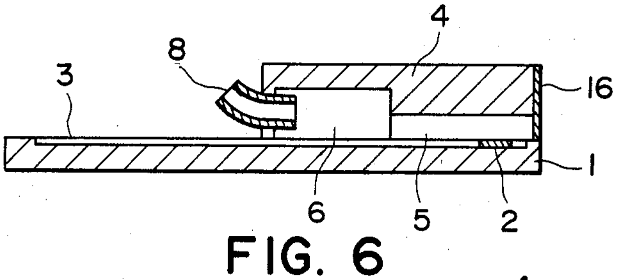
Figure 7:
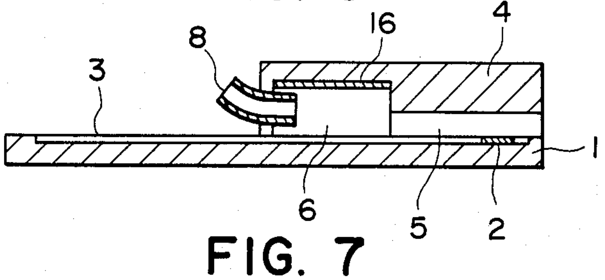
Figure 8:
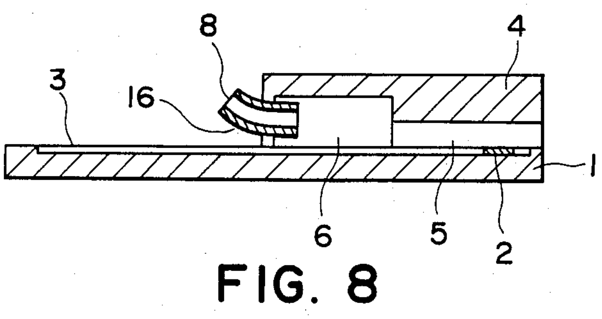

Electrode 16 can be provided on the orifice side as shown in FIG. 6, or on the upper wall of liquid supply chamber 6 as shown in FIG. 7, or in the liquid supply pipe 8, as shown in FIG. 8.

Figure 9:
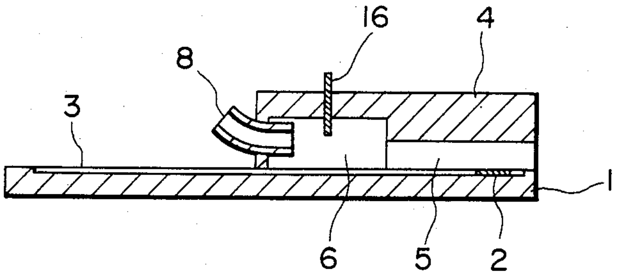

Electrode 16 is not necessarily in a plate form, but a rod-like electrode 16 can be inserted into the liquid supply chamber 6, as shown in FIG. 9.

Figure 10:
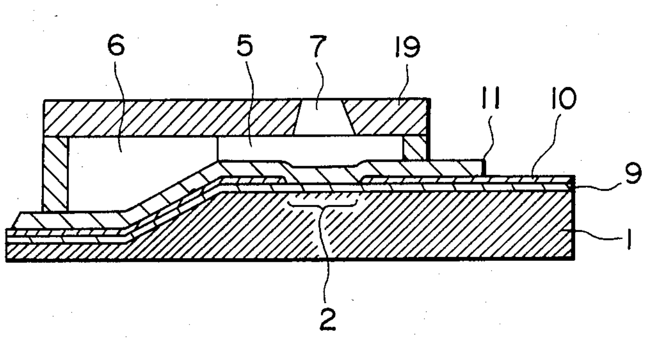

Potential can be imparted to the liquid not only in the case of a liquid-jet recording head of such a type as to discharge the liquid in the direction parallel to the surface side of the heat-generating part 2 in contact with the liquid as shown in FIGS. 5 through 9, but also in the case of a liquid-jet recording head of such a type as to discharge the liquid in a direction at an angle with the surface side of the heat-generating part 2 in contact with the liquid, as shown in FIG. 10.

In FIG. 10, the discharge outlet 7 is provided above the heat-generating part 2, and on the orifice plate 19. The liquid is supplied from a supply pipe (not shown in the drawing) to fill the liquid supply chamber 6 and the liquid passage 5.

In the head of this type, a metallic orifice plate can be usually used as the orifice plate 19 and thus can be applied directly as an electrode for imparting a potential to the liquid. If the orifice plate 19 is not metallic, electrode 16 must be provided in the liquid passage 5 or the liquid supply chamber 6, or the like, as already described above.

When the grooved plate 4 or at least one part of the member constituting the grooved plate 4 in contact with the liquid is made of an electroconductive material, such as metal, etc., plating, etc. will not be required, making the manufacturing process much simpler.

Needless to say, it is necessary that the material for the electrode for imparting a potential to the liquid (third electrode), grooved plate 4, or orifice plate 19 may not be attacked by the liquid, i.e. an ink.

Now, the present invention will be described in detail below, referring to specific test examples.

At first, a relationship between the potential Vink and the life of resistor is investigated.

In FIG. 3, a $SiO_2$ film is formed to a thickness of 5 μm on a Si substrate by thermal oxidation, and tantalum (Ta) is formed to a thickness of 2,000 Å thereon as resistor 9 and gold (Au) to a thickness of 5,000 Å on the resistor as electrode 10. Then, a resistor pattern, 30 μm×100 μm, is formed by photolithography, and then $Ta_2O_5$ is sputtered to a thickness of 5,000 Å thereon as protective film 11. In this test examples, dust particles, about 3 μm in diameter, are intentionally deposited on the resistor before the formation of the protective film to prepare the protective film with defects. Two to five dust particles on average are deposited on the resistor.

The thus formed substrate is tested in an aqueous 0.2 M NaCl solution under the following conditions:

Pulse width: 10 μsec
Frequency: 3 kHz
Voltage (Vh): 20 V.

Gold (Au) is used as electrode 16, which is a counterelectrode to the resistor 9, as shown in FIG. 3. Vink is changed by controlling the power source 17 to apply a pulse voltage to the resistor 9. The number of pulses having been applied until the time when the heat-generating part 2 is damaged, that is, the life of heat-generating part 2, is shown in Table 1.

TABLE 1

| Vink (V) | Life (number of applications) |
|---|---|
| 40 | $2 \times 10^5$ |
| 20 | $4 \times 10^5$ |
| 0 | more than $10^7$ |
| −20 | more than $10^7$ |

In Table 1, when Vink is 20 V, Vh is equal to Vink, which corresponds to the conventional case. As is evident from Table 1, there is a tendency to prolong the life below the Vink of 20 V, and similar tendency can be obtained with NiCr, $ZrB_2$, $HfB_2$, tantalum nitride, etc. as the resistor.

Now, liquid-jet recording heads are prepared in the manner known in the art, and the number of deteriorated nozzles is investigated after $10^8$ pulse voltage applications under the same conditions as the above, except that the thickness of the protective film is 1 μm so as to lessen the defects. The nozzles of the heads thus prepared are 40 μm wide, 40 μm high and 500 μm long. The results are shown in Table 2.

TABLE 2

| Vink (V) | Proportion of deteriorated nozzle (%) |
|---|---|
| 40 | 12 |
| 20 | 5 |
| 10 | 1 |
| 0 | 0 |
| −10 | 0 |
| −20 | 2 |

As is evident from Table 2, desirable Vink values range from −10 (V) to +10 (V) for less number of deterioration, and the proportion of deteriorated nozzle is zero particularly between −10 (V) and 0 (V), and the long life is also obtained, as shown in Table 1.

The foregoing results will be explained, referring to FIG. 11, where the ordinate shows voltage, the abscissa time, and the rectangular curve a change in voltage at the heat-generating part 2 of resistor 9. Dotted line 18 shows a voltage at the location A at the time when an electric current passes through the heat-generating part 2, and dashed line 19 shows a voltage at the location B. As already described above, the location B has a large difference in potential from Vh.

With a lower potential Vink of liquid 12 than that of the heat-generating part 2, the electrochemical reaction is more suppressed, but it is evident from the foregoing test examples that too large difference in potential brought about by the potential Vink being too low will not give a good result. A range can be given substantially by the following formula:

$$Vg - A(Vh - Vg) < Vink < Vg + A(Vh - Vg)$$

where Vg is a ground voltage, Vh a voltage applied to the heat-generating part of resistor, and A is a coefficient, and preferably A=0.5.

Figure 11:
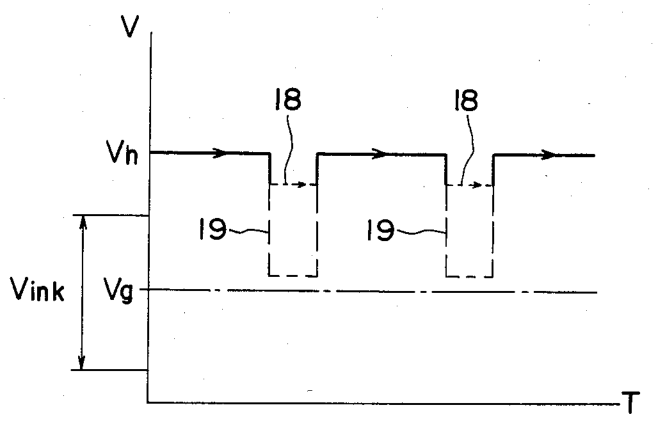
FIG. 11 is a diagram showing changes in voltage with time at the heat-generating part of a resistor.

That is, it is desirable to set Vink to be in a range of ±0.5(Vh−Vg) at Vg as the center, as shown in FIG. 11, and most preferable result can be obtained particularly in the range given by the following formula:

$$Vg - 0.5(Vh - Vg) < Vink < Vg$$

Figure 12:
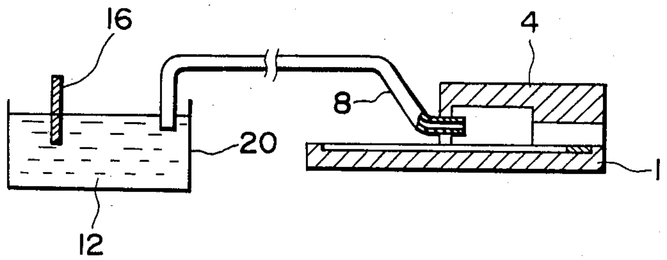
FIG. 12 is a schematic structural view showing another embodiment according to the present invention.

FIG. 12 shows a schematic structural view of another embodiment of an apparatus for liquid-jet recording according to the present invention, wherein a third electrode 16 is inserted into a liquid tank 20 to impart a potential to a liquid, but a satisfactory result can be obtained likewise at other positions of electrode 16 than that shown in FIG. 12. The third electrode can be provided in a supply line between the liquid passage 5 and the tank 20.

Now, the material for resistor 9 will be described in detail below, referring to specific test examples.

In FIG. 3, a $SiO_2$ film is formed to a thickness of 5 μm on a Si substrate by thermal oxidation, and a resistor 9 is formed to a thickness of 2,000 Å thereon, and gold (Au) to a thickness of 5,000 Å on the resistor as electrode 10. Then, a resistor pattern, 30 μm×100 μm, is formed by photolithography, and then $Ta_2O_5$ is sputtered to a thickness of 5,000 Å thereon as protective film 11. In these test examples, dust particles, about 3 μm in diameter, are intentionally deposited on the resistor before the formation of the protective film to prepare the protective film with defects. Two to five dust particles on average are deposited on the resistor formed. Gold (Au) is used as electrode 16 for imparting a potential to the liquid and as a counterelectrode to the resistor 9.

The liquid is an aqueous 0.2 M NaCl solution. Threshold voltage Vth depends on the material, shape, etc. of resistor 9, but in the case of the resistors used in the instant examples, Vth is 18–25 V. In the instant examples, proportion of deteriorated nozzles (%), i.e. percent breakage of resistor, is determined after $10^8$ pulse voltage applications to the resistor by changing the voltage Vink applied to the electrode 16 under the following conditions:

Pulse width: 10 μsec

Driving frequency: 3 kHz

Voltage: 1.3 times the threshold voltage Vth.

The results are shown in Table 3.

TABLE 3

| Resistor | Vink (V) 30 | 10 | 0 | −10 | −20 |
|---|---|---|---|---|---|
| Ta | 100% | 0% | 0% | 0% | 0% |
| Ta70 - Si30 | 100 | 3 | 0 | 0 | 0 |
| Ta30 - Si70 | 100 | 20 | 0 | 1 | 3 |
| Ta80 - Al20 | 100 | 0 | 0 | 0 | 0 |
| Ta50 - Al50 | 100 | 5 | 0 | 0 | 0 |
| Ta20 - Al80 | 100 | 10 | 0 | 7 | 20 |
| $Ta_2N$ | 100 | 0 | 0 | 0 | 0 |
| NiCr | 100 | 100 | 30 | 80 | 100 |
| $ZrB_2$ | 100 | 100 | 18 | 30 | 100 |

In Table 3, the percent breakage of resistor 9 is decreased with a higher content of tantalum (Ta) in a voltage Vink range of −10(V) to 0(V). Particularly with a tantalum content of 30 atomic % or higher in the Vink range of −10(V) to 0(V), very good results can be obtained.

The reason why good results can be obtained with a higher tantalum content of the resistor is that the surface of resistor 9 is anodically oxidized through the defects 13 of protective film 11 and coated with the passive tantalum oxide when Vink is in the range of −10(V) to 0(V). The breakage of resistor due to the defects 13 can be considerably reduced by utilizing this phenomenon. That is, even if there are defects formed in the step for forming the protective film 11 and new defects formed thereafter due to the impacts, etc. caused by vanishing of bubbles, the surface of resistor 9 can be anodically oxidized and covered with a passive film by controlling Vink to the range of −10(V) to 0(V). That is, the electrochemical reaction hardly proceeds in contrast to the prior art.

We claim:

1. A liquid-jet recording head comprising:

heat-generating means for generating heat energy to jet liquid, said heat-generating means including a heat-generating resistor and at least one pair of electrodes electrically connected to said heat-generating resistor for applying a predetermined voltage to said heat-generating resistor;

a protective film provided on said heat-generating means; and a third electrode provided in contact with the liquid for applying a voltage to the liquid lower than the predetermined voltage applied to said heat-generating resistor.

2. An apparatus according to claim 1, wherein said third electrode is provided in a liquid passage.

3. An apparatus according to claim 1, wherein said third electrode is provided on a wall of a liquid passage.

4. An apparatus according to claim 1, wherein said third electrode is an orifice plate having an orifice for jetting the liquid.

5. An apparatus according to claim 1, wherein said heat-generating resistor contains 30 atomic % or more of tantalum Ta.

6. An apparatus according to claim 1, wherein the liquid is jetted by rapid growth and contraction of bubbles generated in the liquid by the energy imparted to the liquid.

7. An apparatus for liquid-jet recording comprising:

heat-generating means for generating heat energy to jet liquid, said heat-generating means including a heat-generating resistor and at least one pair of electrodes electrically connected to said heat-generating resistor for applying a voltage Vh to said heat-generating resistor;

a protective film provided on said heat generating means;

a third electrode provided in contact with the liquid for applying a voltage $V_{ink}$ to the liquid lower than the voltage Vh applied to said heat-generating resistor; and a power source for supplying a voltage to said third electrode.

8. An apparatus according to claim 7, wherein said third electrode is provided in a liquid passage.

9. An apparatus according to claim 7, whrein said third electrode is provided on a wall of liquid passage.

10. An apparatus according to claim 7, wherein said third electrode is provided in a tank containing the liquid.

11. An apparatus according to claim 7, wherein said third electrode is an orifice plate having an orifice for jetting the liquid.

12. An apparatus according to claim 7, wherein said third electrode is a liquid supply pipe for supplying the liquid.

13. An apparatus according to claim 7, wherein said third electrode is provided between a liquid passage and a tank containing the liquid.

14. An apparatus according to claim 7, wherein said heat-generating resistor contains 30 atomic % or more of tantalum Ta.

15. An apparatus according to claim 7, wherein the liquid is jetted by rapid growth and contraction of bubbles generated in the liquid by the energy imparted to the liquid.

16. Liquid-jet recording apparatus comprising:

heat-generating means for generating heat energy to jet liquid, said heat-generating means including a heat-generating resistor, at least one pair of electrodes electrically connected to said heat-generating resistor for applying a voltage Vh to said heat-generating resistor, and a protective film provided on the heat-generating means;

a third electrode provided in contact with the liquid for applying a voltage $V_{ink}$ to the liquid lower than the voltage Vh applied to said heat-generating resistor; and a power source for supplying the voltage $V_{ink}$ in a range given by the following formula:

$$Vg - A(Vh - Vg) < V_{ink} < Vg + A(Vh - Vg)$$

wherein Vg is ground voltage and A is 0.5.

* * * * *